Patented Oct. 16, 1923.

1,471,059

UNITED STATES PATENT OFFICE.

HERMANN PLAUSON, OF HAMBURG, GERMANY.

PROCESS FOR THE MANUFACTURE OF RUBBER AND EBONITE SUBSTITUTES.

No Drawing. Application filed February 12, 1921. Serial No. 444,486.

*To all whom it may concern:*

Be it known that I, HERMANN PLAUSON, Esthonian subject, residing in Hamburg, Germany, have invented certain new and useful Process for the Manufacture of Rubber and Ebonite Substitutes, of which the following is a specification.

It is known that rubber-like masses, the so-called substitutes, are obtained by treating fish oils or similar oils with sulphur chloride but these substances do not present the elasticity or nerve of rubber but are more or less crumbly. According to the present invention, fatty acids such as formic acid, acetic acid, oleic acid, etc., are used together with fish oils or other oils and such a mixture is then vulcanized e. g. treated with sulphur chloride or heated with sulphur when substitutes are formed whose elasticity is similar to that of rubber so that they can be worked in the same way.

*Example 1.*

Process for the manufacture of a mass resembling soft rubber.

100 parts of linseed oil are mixed with 10 parts of oleic acid and 10 parts of a 10% rubber solution, preferably in a homogenizing apparatus. 20 parts of sulphur chloride are added to the mass in this apparatus in a thin stream with vigorous agitation. The mixture is then diluted with 20 parts of water, and finally neutralized with 20 parts of a 15% ammonia solution. The product is evaporated to a viscous consistency and then dried. The product is not crumbly as hitherto but is a very elastic mass resembling soft rubber; by heating to 240° C., it can be made completely homogeneous and resistant to atmospheric conditions. Another unsaturated acid of the oleic acid series can be used instead of oleic acid or formic acid, acetic acid or other fatty acids are applicable according to the nature of the final product desired. The acid can be added in quantities up to 30%.

*Example 2.*

Manufacture of a body resembling ebonite.

A solid rubber-like mass is obtained from the liquid emulsions described in example 1 when these are completely neutralized with water and the emulsion is evaporated to a viscous consistency, but still remains plastic. This plastic mass is then treated in a mixing machine or on rollers or the like with 3 parts of lead oxide or zinc oxide, iron oxide and antimony sulphide. If desired, fibrous substances, graphite or the like can be added or dyes to give the finished mass the desired colour. The mass can be pressed and dried while still plastic preferably in vacuo with gentle heating to 50–70° C. After the moulded masses are completely dried they are exposed for 6 hours to a pressure of 6 atmospheres or over when a completely resistant hard rubber-like mass is obtained which can be used as ebonite substitute.

*Example 3.*

100 parts of fish oil are mixed with 15 parts of oleic acid and 15 parts of flowers of sulphur are added. The mixture is completely homogenized in a suitable homogenizing apparatus when the product obtained is heated in an autoclave with a jacket or in an oil-bath, etc., to 115 to 240° C. for from 1 to 5 hours according to the vulcanization required when a homogeneous rubber-like elastic mass is obtained which is resistant to atmospheric conditions. On treating for only half to one hour, a liquid oil is obtained which after neutralizing excess of oleic acid and after thorough washing is a very good drying oil-varnish substitute. If the pressure is raised to 2 to 50 atmospheres during treatment according to the final results desired, preferably by using carbon dioxide, nitrogen or other inert gases, the time and temperature can be reduced. Other saturated and unsaturated fatty acids can be used instead of oleic acid and especially unsaturated acids of the type $C_nH_{2n-2}O_2$, acids of the acrylic series. These latter have the advantage that they need not be washed out but can remain in the mass since their acid character is lost during the treatment as they combine with oil and sulphur; they can therefore be added up to 30 to 50%.

Obviously the substitutes obtained can be mixed before or after treatment with any suitable fibrous or pulverulent filler and the mixture worked to a more or less hard mass.

Although the heating can be effected in an open vessel, it is quicker and safer in a closed vessel and is particularly effective when using artificial pressure.

The rubber-like properties of the mass can obviously be increased still further by adding larger or smaller quantities of natural or artificial rubber.

It could not have been foreseen that by heating oils with saturated or unsaturated organic acids together with sulphur, it would be possible to obtain results as good or better than those obtained by treatment with sulphur chloride at ordinary temperatures.

The term "rubber substitute" is used to include either hard ebonite or soft rubber substitutes.

It will be seen that the essential feature of the invention is the use of a free acid in substantial quantity, e. g., of the order of magnitude indicated in the examples, and the term "substantial quantity" is to be understood as excluding mere traces of fatty acid which may be introduced into the composition together with other ingredients.

I declare that what I claim is:—

1. Process for the manufacture of a rubber substitute by vulcanizing a mixture of a substantial quantity of an unsubstituted free fatty acid and a vulcanizable oil.

2. Process for the manufacture of a rubber substitute by vulcanizing a mixture of an unsaturated fatty organic acid, and a vulcanizable oil.

3. Process for the manufacture of a hard rubber substitute by vulcanizing a mixture of a substantial quantity of an unsubstituted free fatty acid with a vulcanizable oil.

4. Process for the manufacture of a rubber substitute by vulcanizing a mixture of an acid of the acrylic series and a vulcanizable oil.

5. Process for the manufacture of a rubber substitute by heating a mixture of a substantial quantity of a fatty acid and a vulcanizable oil with sulphur.

6. Process for the manufacture of a rubber substitute by heating a mixture of an unsaturated fatty organic acid, a vulcanizable oil and sulphur.

7. Rubber substitute consisting of a hot-vulcanized composition of an unsaturated fatty organic acid and a vulcanizable oil.

8. Rubber substitute comprising a hot-vulcanized composition of a fatty acid and a vulcanizable oil.

9. A rubber substitute comprising a vulcanized composition of a substantial quantity of a fatty organic acid and a vulcanizable oil.

In witness whereof, I have hereunto signed my name this 30th day of Dec'r, 1920, in the presence of two subscribing witnesses.

HERMANN PLAUSON.

Witnesses:
I. VICTOR ARMSTRONG,
W. H. BEERTON.